United States Patent
Chu et al.

(10) Patent No.: US 8,306,928 B2
(45) Date of Patent: Nov. 6, 2012

(54) SYSTEM FOR MAINTAINING AND ANALYZING MANUFACTURING EQUIPMENT AND METHOD THEREOF

(75) Inventors: Chun-I Chu, Hsinchu County (TW); Ching-Shun Chen, Changhua County (TW); Tze-Chin Chou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 898 days.

(21) Appl. No.: 12/360,234

(22) Filed: Jan. 27, 2009

(65) Prior Publication Data

US 2010/0152878 A1 Jun. 17, 2010

(30) Foreign Application Priority Data

Dec. 16, 2008 (TW) ................................ 97148965 A

(51) Int. Cl.
*G06Q 30/00* (2012.01)
*G07B 15/02* (2011.01)
(52) U.S. Cl. ................................ 706/14; 700/29; 607/45
(58) Field of Classification Search ...................... 706/14
See application file for complete search history.

(56) References Cited

U.S. PATENT DOCUMENTS

| 2002/0047987 A1* | 4/2002 | Massengill et al. ........... 351/204 |
| 2005/0288812 A1 | 12/2005 | Cheng et al. |
| 2009/0043441 A1* | 2/2009 | Breed ............................. 701/29 |
| 2009/0300417 A1* | 12/2009 | Bonissone et al. ............. 714/26 |

FOREIGN PATENT DOCUMENTS

| TW | 460687 B | 10/2001 |
| TW | 533469 | 5/2003 |
| TW | I227442 B | 2/2005 |
| TW | I264897 B | 10/2006 |

* cited by examiner

*Primary Examiner* — Kakali Chaki
*Assistant Examiner* — Kalpana Bharadwaj
(74) *Attorney, Agent, or Firm* — Rabin & Berdo, P.C.

(57) ABSTRACT

A system and a method are used for maintaining and analyzing manufacturing equipment. The system includes an embedded forecast device (EFD) configured in the manufacturing equipment and a server in communication with the EFD. The EFD is built in with a feature extraction (FE) algorithm and a forecast model (FM), so as to obtain a real time data of the manufacturing equipment and carry out forecasts on the manufacturing equipment to generate a forecast result. The server has various types of FE algorithms and modeling algorithms, which are selected and combined by a user for training and building a required FM and setting related parameters. The embedded forecast device also has a novelty detection model (NDM), which is capable of informing the server to retrain the models when the manufacturing equipment fails and then to update the FM and the NDM of the embedded forecast device.

14 Claims, 6 Drawing Sheets

SYSTEM FOR MAINTAINING AND ANALYZING MANUFACTURING EQUIPMENT AND METHOD THEREOF

CROSS-REFERENCE TO RELATED APPLICATIONS

This non-provisional application claims priority under 35 U.S.C. §119(a) on Patent Application No(s). 097148965 filed in Taiwan, R.O.C. on Dec. 16, 2008 the entire contents of which are hereby incorporated by reference.

BACKGROUND OF THE INVENTION

1. Field of the Invention

The present invention relates to a performance measurement system and a performance measurement method of a manufacturing equipment, and more particularly to a maintenance and analysis system and a method thereof applicable to an environment of multiple manufacturing equipments, which are capable of managing and maintaining forecast models of the manufacturing equipments by using a work division architecture of embedded forecast devices and servers according to different analysis strategies and automatically updating the forecast model in the embedded forecast device when the manufacturing equipment fails.

2. Related Art

Generally, a method for maintaining and measuring a manufacturing equipment only involves performing a simple signal analysis and employing some fixed determination rules to monitor the operating status of the manufacturing equipment and the quality of the products. However, the problem of the manufacturing equipment varies with the seasons and the environment of the plant, and thus different problems occur. In this manner, most conventional fixed determination rules and signal analysis manners may result in mis-determinations, thereby severely affecting the maintenance and measurement of the manufacturing equipment or the product quality. Therefore, some techniques capable of monitoring the working status of the manufacturing equipment and making an alarm in the case of an operation error or an abnormity of the product are gradually emphasized, and more and more techniques have been proposed to solve the above problems.

The ROC Patent No. 533469 discloses a standardized performance tracking system for manufacturing equipment and a method thereof, which are capable of analyzing the performance of a plurality of manufacturing equipments. The system includes a message translator, for translating a message generated by each manufacturing equipment into a standard message and utilizing a data server to receive the standard messages to create an source data table; a data analyzer, for reading the source data table to create a summary table; and an analysis module, for analyzing the performances of the manufacturing equipments through the source data table, a configuration table, and the summary table. Though the disclosed technique can analyze the performances of a plurality of manufacturing equipments, the analysis of the performances of all these manufacturing equipments is performed by one machine, and the great working load may definitely influence the performance analysis and the forecast efficiency for the manufacturing equipments.

The US Patent No. 20050288812 discloses a quality prognostics system and method for manufacturing processes. In the prognostics method, at least one previous actual measurement value and a model prediction value are used to predict the quality of a next product lot. However, the disclosed technique fails to provide a method for analyzing the performance of the manufacturing equipments or provide a solution for retraining the forecast model.

Though the aforementioned prior arts have respectively disclosed a method for analyzing the performances of the manufacturing equipments and a method for forecasting the product quality, it does not provide any solution for automatically feeding back an abnormal information when the manufacturing equipment fails or any solution for retraining the forecast models.

SUMMARY OF THE INVENTION

Accordingly, the present invention is directed to a system for maintaining and analyzing a manufacturing equipment, which is adapted to manage and maintain forecast models of a plurality of manufacturing equipments, automatically feed back an abnormal information when the manufacturing equipment fails, and retrain and update the forecast models of the manufacturing equipments.

The present invention is further directed to a system for maintaining and analyzing a manufacturing equipment, which enables a user to set and combine different algorithms flexibly according to different analysis strategies, so as to generate a required forecast model.

In view of the above, the present invention provides a system for maintaining and analyzing a manufacturing equipment, which includes an embedded forecast device and a server.

The embedded forecast device mounted in the manufacturing equipment is preferably an embedded system device built-in with a feature extraction (FE) algorithm and a forecast model, so as to obtain a real time data of the manufacturing equipment and carry out forecasts on the manufacturing equipment to generate a forecast result. The embedded forecast device further has a novelty detection model for generating a model retraining notification message when the manufacturing equipment fails.

The server in communication with the embedded forecast device has various different FE algorithms and modeling algorithms, which are provided for being selected and combined by a user to generate a required forecast model and set related parameters. The server further retrains the forecast model and the novelty detection model according to the model retraining notification message, and updates the forecast model and the novelty detection model in the embedded forecast device by using an update mechanism.

Therefore, the system for maintaining and analyzing a manufacturing equipment provided in the present invention is suitable for alleviating the working load of the server in the system, thereby improving the operating performance.

Additionally, in the present invention, the motions of building and training the models are separated from an online forecast motion, each manufacturing equipment is mounted with an embedded forecast device, in which the server is in charge of the training and modeling motions, and the embedded forecast device is in charge of the online forecast and performance analysis of the manufacturing equipment. By using such a one-to-many work division architecture, not only the working load of the conventional server that must perform the online forecast, training, and modeling on a plurality of manufacturing equipments is alleviated, but also the embedded forecast device of the manufacturing equipment only needs to care about the online forecast and performance analysis of the manufacturing equipment, instead of wasting resources on the training and modeling motions.

The present invention further provides a method for maintaining and analyzing a manufacturing equipment, which is suitable for supporting a quality forecast of a plurality of manufacturing equipments and an automatic update of a forecast model.

The method of the present invention includes the following steps.

First, an embedded forecast device is provided. An FE algorithm, a forecast model, and a novelty detection model are pre-loaded into the embedded forecast device. The embedded forecast device is mounted in the manufacturing equipment, so as to obtain a real time data of the manufacturing equipment and carry out forecasts on the manufacturing equipment to generate a forecast result.

Next, a server is built. The server is pre-loaded with various FE algorithms and modeling algorithms, which are provided for being selected and combined by a user to obtain a required forecast model and set related parameters.

Then, a novelty detection is performed on the real time data of the manufacturing equipment, and a model retraining notification message is sent when a new feature data is found.

Then, the models are retrained. Once receiving the model retraining notification message, the server retrains the forecast model and the novelty detection model according to the new feature data and support vectors of the old model.

Finally, the models are updated. The server uploads the retrained forecast model and novelty detection model to the embedded forecast device of the manufacturing equipment, thereby completing the updating process of the forecast model and the novelty detection model.

Based on the above technical solutions, in the present invention, the training and modeling motions are separated from the online forecast motion, the server is in charge of the training and modeling motions, and the embedded forecast device is in charge of the online forecast motion. By using such a one-to-many work division architecture, not only the working load of the conventional server that must perform the online forecast on a plurality of manufacturing equipments is alleviated, but also the embedded forecast device of the manufacturing equipment only needs to care about the online forecast, instead of wasting resources on the training and modeling motions, thereby accelerating the status forecast or quality forecast of the manufacturing equipments carried out by the embedded forecast device. Moreover, the present invention employs a feedback mechanism and an automatic model retraining function of the novelty detection model, so as to reduce the frequency for the engineers to manually train the forecast model and the time spent accordingly. In addition, different algorithms can be set and combined flexibly in the server according to different analysis strategies, so as to generate a required forecast model for being used by the embedded forecast device.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
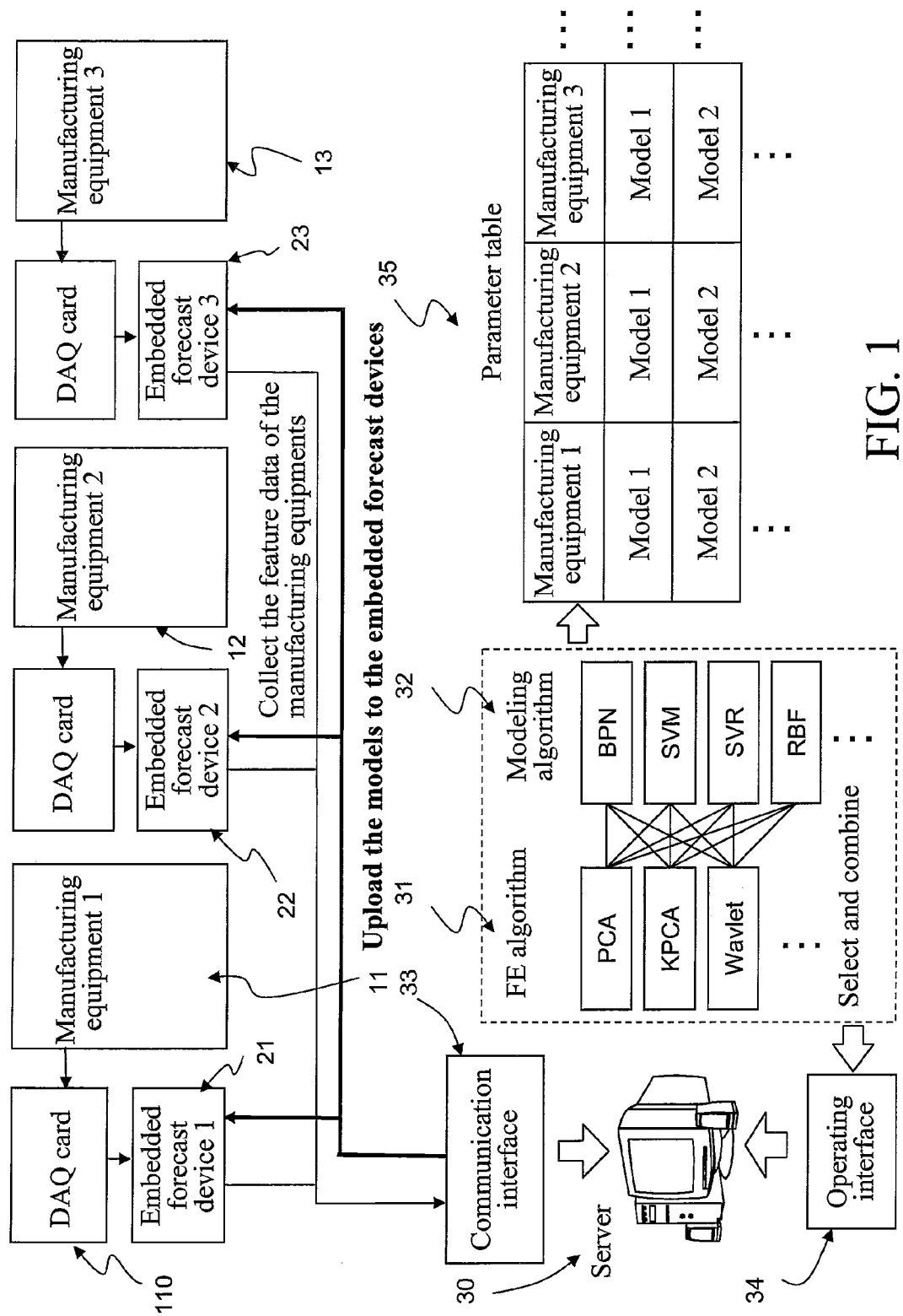
FIG. 1 is a system architectural view of a preferred embodiment of the present invention.

FIG. 1 is a system architectural view of a preferred embodiment of the present invention. In this embodiment, though a system for maintaining and analyzing a plurality of manufacturing equipments 11, 12, and 13 is taken as an example, the system is also applicable to an environment of a single manufacturing equipment. The system includes a plurality of embedded forecast devices 21, 22, and 23 and a server 30.

The embedded forecast devices 21, 22, and 23 are respectively mounted in each of the manufacturing equipments 11, 12, and 13, and are preferably embedded system devices. The embedded prediction device 21 is built-in with an FE algorithm 211 and a forecast model 212 (referring to FIG. 2), so as to obtain a real time data of the manufacturing equipment 11 and generate a forecast result. The embedded forecast device 21 further includes a novelty detection model 213 capable of sending a model retraining notification message when the manufacturing equipment 11 fails.

The server 30 communicates with the embedded forecast devices 21, 22, and 23 and has various different FE algorithms 31 and modeling algorithms 32, which are provided for being selected and combined by a user for training and building the required forecast model 212 and the novelty detection model 213 and setting related parameters. The server 30 further retrains the models according to the model retraining notification message, and updates the models in the embedded forecast devices 21, 22, and 23 by using an update mechanism.

Figure 2:
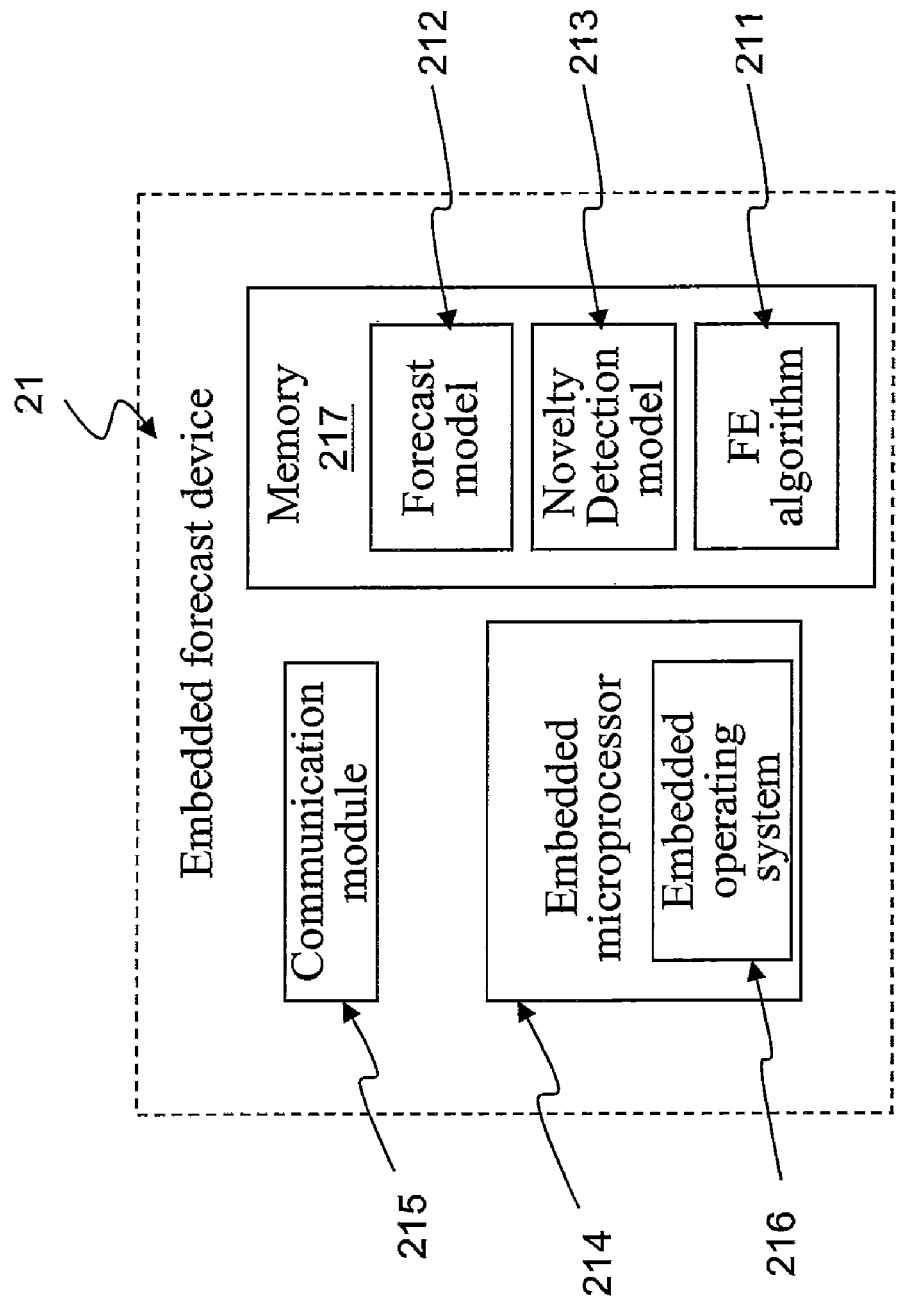
FIG. 2 is an architectural view of an embedded forecast device according to a preferred embodiment the present invention.

The embedded forecast device 21 is taken as an example below. Referring to FIG. 2, the embedded forecast device 21 includes an embedded microprocessor 214, a peripheral hardware equipment (for example, a communication module 215, a memory 217, and a data storage unit), an embedded operating system 216 (for example, Embedded Linux), and a user-built application. In a preferred embodiment of the present invention, the embedded forecast device 21 of the present invention is formed by an Advanced RISC Machines (ARM) microprocessor with Embedded Linux as an operating system and a communication module 215. The embedded forecast device 21 is mounted in the manufacturing equipment 11 for receiving a real time data from the manufacturing equipment 11. In a preferred embodiment, the embedded forecast device 21 obtains the real time data from the manufacturing equipment 11 through, for example, but not limited to, a data acquisition card (DAQ card) 110. The communication module 215 of the embedded forecast device 21 may be a network card, a wireless network card, or a blue-tooth communication module, so as to communicate with the server.

The server 30 is basically a computer, which may be a server computer or a general personal computer (PC), and include a communication interface 33 for communicating with the communication module 215 of the embedded forecast device 21. The server 30 is loaded with various FE algorithms 31 and modeling algorithms 32. The FE algorithms 31 include, for example, but not limited to, kernel principal component analysis (KPCA), principal component analysis (PCA), and wavelet analysis algorithms. The modeling algorithms 32 include, for example, but not limited to, support vector machine (SVM), support vector regression model (SVR Model), support vector data description (SVDD), radial basis function (RBF), and back-propagation neural network (BPN) algorithms. During the initial modeling motion, the user respectively selects one algorithm from the FE algorithms 31 and the modeling algorithms 32 and combines the two algorithms via an operating interface 34 of the server 30 (for example, an operation picture shown on a display or equivalents with the same function) for training and building the required model. Here, the models include, but not limited to, a quality forecast model and the novelty detection model 213. Furthermore, depending upon the actual requirements, the user may utilize the FE algorithms 31 and the modeling algorithms 32 to generate, for example, a forecast model 212 for inspecting a manufacturing equipment status or product defects. The related parameters set when training and building the models are stored in a parameter table 35 and reserved in the server. In a preferred embodiment, the parameter table 35 includes the following parameters:

Project ID: an ID of an analysis project;
Device ID: and ID of an embedded forecast device;
Device IP address: an IP address of the embedded forecast device;
Data Source: a data source of manufacturing equipment;
FE Algorithm: an adopted FE algorithm;
FE Parameter: parameter settings of the adopted FE algorithm;
Modeling Algorithm: an adopted training modeling algorithm;
Modeling Parameter: parameter settings of the adopted training modeling algorithm;
Auto re-Train: a parameter whether an automatic retraining mechanism is performed or not (True/False);
Need re-Train: a field for identifying whether a retraining is needed or not on a maintenance and analysis platform (True/False);
Modeling model: a forecast model;
SVDD model: a novelty detection model;
SVDD Support Vector: support vectors of the novelty detection model; and
Model create time: time required for creating a forecast model.

Generally, the embedded forecast devices 21, 22, and 23 configured in each of the manufacturing equipments 11, 12, and 13 are respectively assigned with a unique and unrepeated "Device ID", and each of the embedded forecast devices 21, 22, and 23 has a corresponding parameter setting table. In order to realize the communication between the server 30 and the embedded forecast devices 21, 22, and 23, the parameter table 35 further records communication positions of the embedded forecast devices 21, 22, and 23. In a preferred embodiment of the present invention, a network technique is employed to search for one of the embedded forecast devices 21, 22, and 23 in various manufacturing equipments 11, 12, and 13. Therefore, an Internet protocol (IP) address is allocated to the embedded forecast devices 21, 22, and 23 respectively, and the IP address thereof is recorded in the parameter "Device IP address". In a feasible embodiment, the user randomly combines the FE algorithms and the modeling algorithms based on different analysis strategies to generate the required forecast model 212 and the novelty detection model 213, and performs a project management through the parameter "Project ID" in the parameter table 35, so as to determine the forecast model 212, the novelty detection model 213, and the related parameters used in any of the embedded forecast devices 21, 22, and 23 in the manufacturing equipments 11, 12, and 13.

The novelty detection model 213 pre-loaded in the embedded forecast device 21 is built according to the SVDD algorithm, and the novelty detection model 213, the forecast model 212, and the FE algorithm 211 are all burnt in the memory 217 or the data storage unit of the embedded forecast device 21. For the updating purpose, the memory 217 or the data storage unit must be an element capable of accessing or overwriting data, which includes, but not limited to, a flash memory, a hard disk, and another element.

Once the system has been constructed and starts working, the embedded forecast device 21 first obtains a real time data of the manufacturing equipment 11, extracts a feature data from the obtained real time data through the FE algorithm 211 according to related parameters stored in the parameter table 35, and generates by using the forecast model 212, for example, a forecast result about a product quality and an equipment status for the field engineer to make references. The forecast result may be directly shown on an output device of the manufacturing equipment 11, for example, a display (not shown), or may be output through other means. Meanwhile, the novelty detection model 213 of the embedded forecast device 21 performs a novelty detection on the obtained feature data, and sends a model retraining notification message to request the server 30 to retrain the models when it found that the manufacturing equipment 11 fails. In particular, the novelty detection model 213 analyzes the extracted feature data to see whether a new feature data exists or not. If a new feature data is found (i.e., a feature data exceeding the range of the SVDD algorithm), the novelty detection model 213 requests the server 30 to retrain the forecast model 212 and the novelty detection model 213 according to the new feature data and support vectors of an old model and then to upload the retrained forecast model 212 and the novelty detection model 213 to the embedded forecast device 21, thereby finishing updating the forecast model 212 and the novelty detection model 213. After a new feature data is found, besides the forecast model 212, the novelty detection model 213 also needs to be retrained, so as to avoid an error response for requesting a model retraining when the same new feature data appears again.

Generally, the novelty detection is applied in the following circumstances. (1) A well-trained classifier or regressor only provides a reliable estimated value to a feature dataset close to or distributed in a training dataset, and as for unknown feature dataset areas or feature datasets distributed far away, the result output by the forecast model is highly uncertain. Therefore, the novelty detection should be first used to remove the outlier, so as to avoid generating a forecast result that is not supported by facts. (2) Regarding problems in statistics/machine learning, a certain class may achieve satisfactory samples, while others may have a problem about severely insufficient samples. For example, during the monitoring of the operating status of the manufacturing equipment, the features in a normal operation are easily obtained, but it is difficult to collect the sensing data in an abnormal status, and what's worse, the equipment may even have to be deliberately damaged, which requires a high cost and has a poor feasibility. Therefore, a data description boundary capable of fully sampling the status feature set needs to be found for detecting features in an abnormal operation of the manufacturing equipment. (3) Indexes for determining whether the forecast model needs to be retrained or not need to be established. Through the novelty detection, when the previously adopted training dataset apparently differs from the currently collected real time dataset, it indicates that the forecast model needs to be retrained.

According to a preferred embodiment of the present invention, the method includes the following steps.

First, an embedded forecast device is provided. An FE algorithm, a novelty detection model, and a forecast model are pre-loaded into the embedded forecast device. The embedded forecast device is mounted in the manufacturing equipment for obtaining a real time data of the manufacturing equipment, extracting a feature data from the obtained real time data through the FE algorithm, and generating a forecast result through the forecast model.

Next, a server is built. The server is pre-loaded with various FE algorithms and modeling algorithms provided for being selected and combined by a user for training and building the required forecast model and novelty detection model and setting related parameters for being stored in a parameter table.

Then, a novelty detection is performed on the real time data of the manufacturing equipment, and a model retraining notification message is sent when a new feature data is found.

Then, the models are retrained. Once receiving the model retraining notification message, the server retrains the forecast model and the novelty detection model according to the new feature data and support vectors of an old model.

Then, the forecast model and the novelty detection model are updated. The server uploads the retrained forecast model and the novelty detection model to the embedded forecast device of the manufacturing equipment, thereby updating the forecast model and the novelty detection model.

Figure 3:
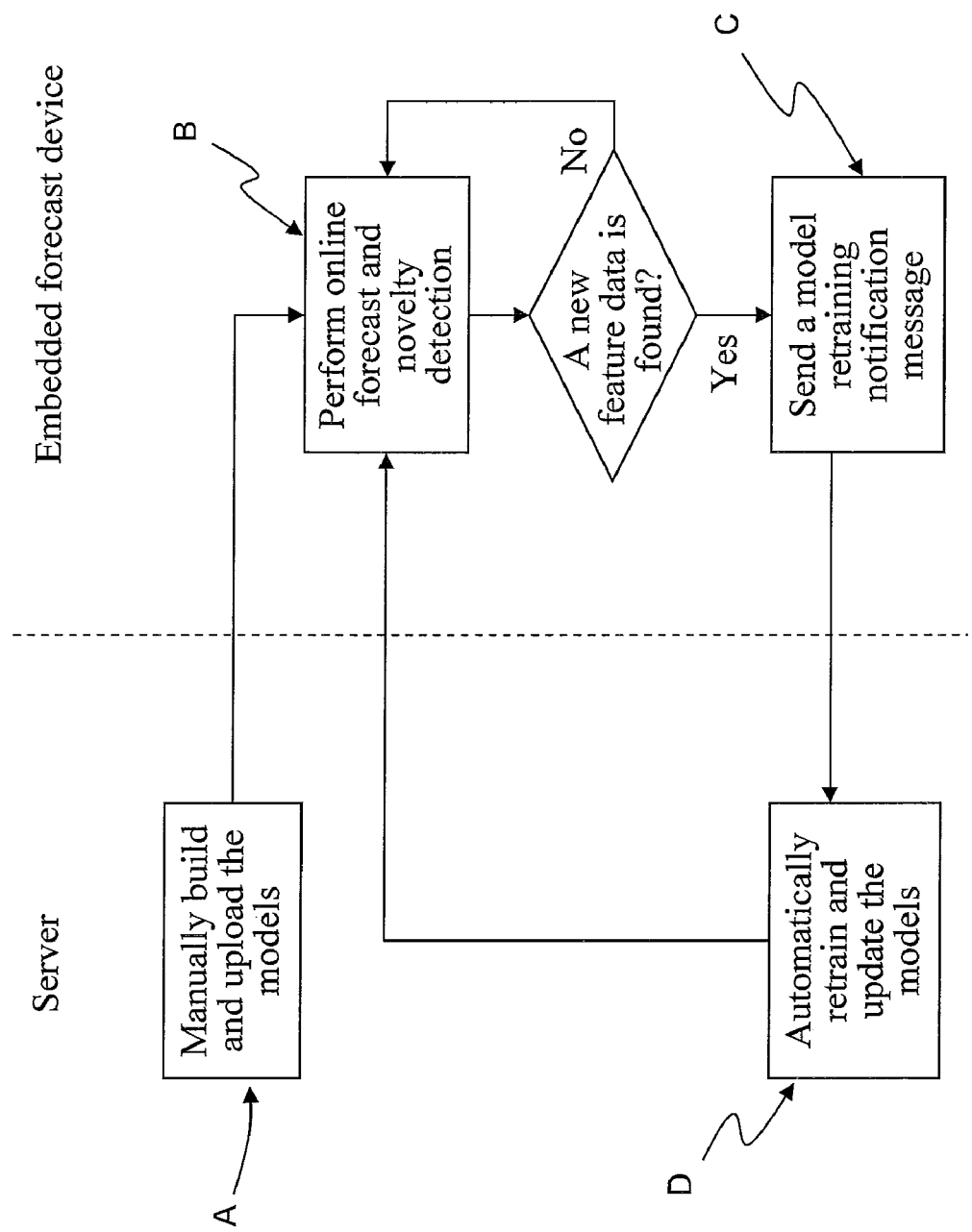
FIG. 3 is a flow chart of a whole operating process of a system for maintaining and analyzing a manufacturing equipment according to the present invention.

FIG. 3 is a flow chart of a whole operating process of a system for maintaining and analyzing a manufacturing equipment. The process includes the following steps.

Step A. An initial modeling and model uploading are performed.

Step B. An online forecast and novelty detection are performed.

Step C. When the novelty detection model finds out a new feature data, the embedded forecast device sends a model retraining notification message to request the server to retrain the forecast model and the novelty detection model; if no new feature data is found, the process goes back to the previous step to continue performing the online forecast and novelty detection.

Step D. The models are automatically retrained, and the models in the embedded forecast device are updated.

Figure 4:
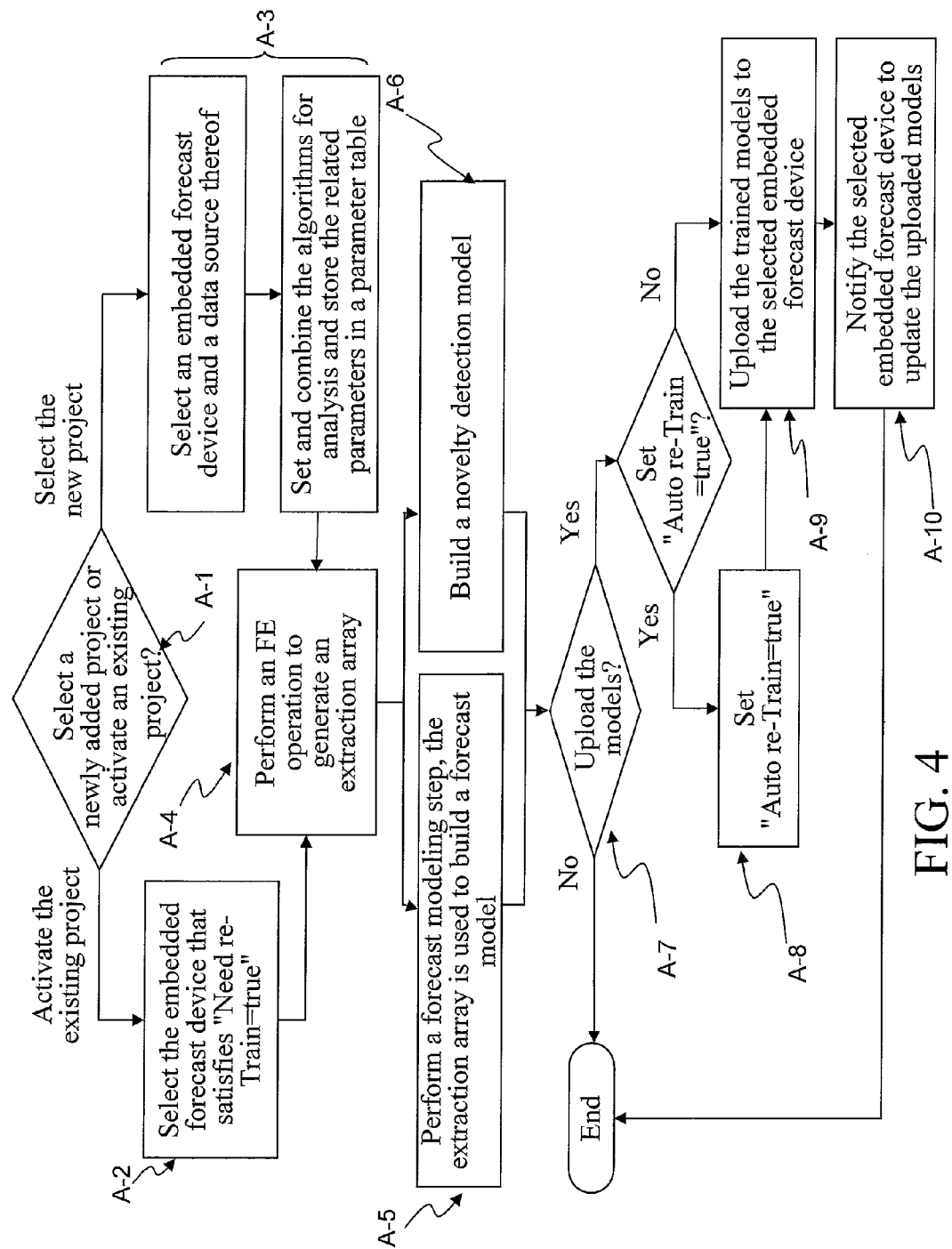
FIG. 4 is a partial detailed flow chart of the system for maintaining and analyzing a manufacturing equipment according to the present invention.

As described above, Step A is the first motion performed after the system has been constructed and starts working, which aims at fulfilling the initial building motion of the forecast model and the novelty detection model. In particular, the user respectively selects one algorithm from the FE algorithms and the modeling algorithms of the server and combines the two algorithms for building the forecast model and the novelty detection model, then transmits the built forecast model and novelty detection model to the embedded forecast device for storing, and stores the setting parameters related to the training and building of the forecast model and novelty detection model in a parameter table of the server. The detailed process of Step A is described as follows with reference to FIG. 4.

Step A-1. Options are provided for the user to select a newly added project or to activate an existing project.

Step A-2. In the mode of activating an existing project, the server selects a parameter setting table with a parameter "Need re-Train" set as "True (indicating the models need to be retrained)" from various parameter setting tables, and sets the embedded forecast device corresponding to the parameter setting table as a target for manual modeling.

Step A-3. In the mode of selecting a newly added project, the user selects an embedded forecast device and the data source of the manufacturing equipment, selects one algorithm from the FE algorithms and the modeling algorithms respectively, combines the two algorithms, and stores the related setting parameters in a parameter table.

Step A-4. A feature extraction (FE) operation is performed to generate an extraction array.

Step A-5. Perform a forecast modeling step, the extraction array is used to build a forecast model.

Step A-6. A novelty detection model is built at the same time (for example, according to the SVDD algorithm).

Step A-7. The following steps are performed when the user determines to upload the models; otherwise, the process ends.

Step A-8. When the user determines to activate a function option of automatically retraining the models, a parameter "Auto re-Train" in the parameter setting table is first set as "True"; otherwise, the following steps are performed.

Step A-9. The trained models (including the trained forecast model, FE algorithm, and novelty detection model) are uploaded to the selected embedded forecast device.

Step A-10. The selected embedded forecast device is notified to update the uploaded models.

Figure 5:
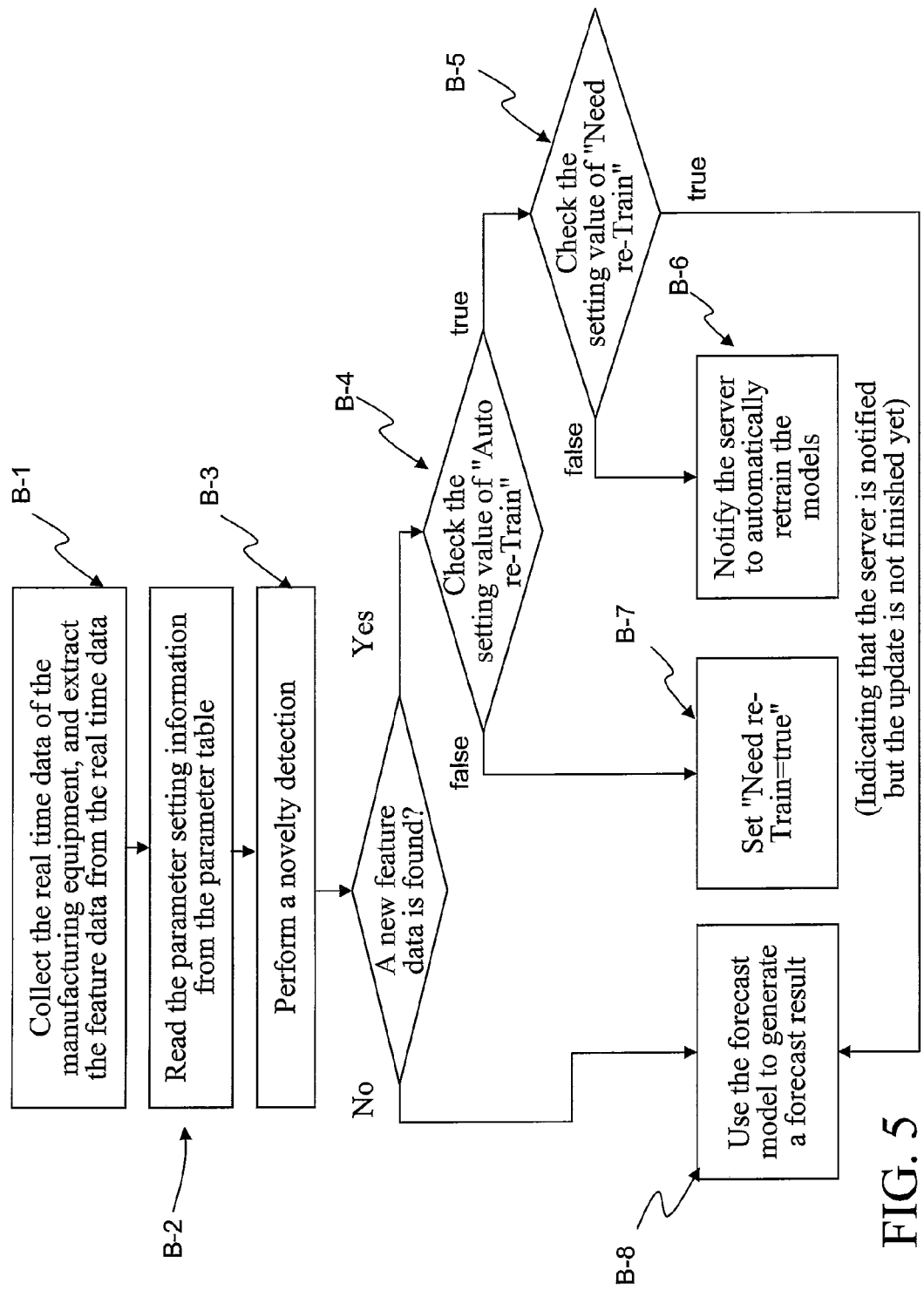
FIG. 5 is a partial detailed flow chart of the system for maintaining and analyzing a manufacturing equipment according to the present invention.

As described above, in Step B, the embedded forecast device configured in the manufacturing equipment mainly extracts the feature data from the real time data of the manufacturing equipment through the FE algorithm according to the parameter setting information in the parameter table, and then analyzes the feature data by the forecast model to generate a forecast result. Meanwhile, the novelty detection model performs a novelty detection on the obtained feature data to determine whether to notify the server to retrain the models or not. The detailed process of Step B is described as follows with reference to FIG. 5.

Step B-1. The real time data of the manufacturing equipment is collected, and the feature data is extracted from the real time data through the FE algorithm.

Step B-2. The parameter setting information is read from the parameter table.

Step B-3. The novelty detection model is employed to perform a novelty detection on the obtained feature data.

Step B-4. When a new feature data is found, the setting value of the parameter "Auto re-Train" in the parameter table is checked. If no new feature data is found, the process skips to Step B-8, and when the parameter "Auto re-Train" is set as "False", the process skips to Step B-7.

Step B-5. When the parameter "Auto re-Train" in the parameter table is set as "True", the setting value of the parameter "Need re-Train" in the parameter table is checked. When the parameter "Need re-Train" is set as "True", the process skips to Step B-8; otherwise, Step B-6 is performed.

Step B-6. A model retraining notification message is sent to notify the server to automatically retrain the models.

Step B-7. The parameter "Need re-Train" in the parameter table is set as "True".

Step B-8. The forecast model is employed to generate the forecast result.

Figure 6:
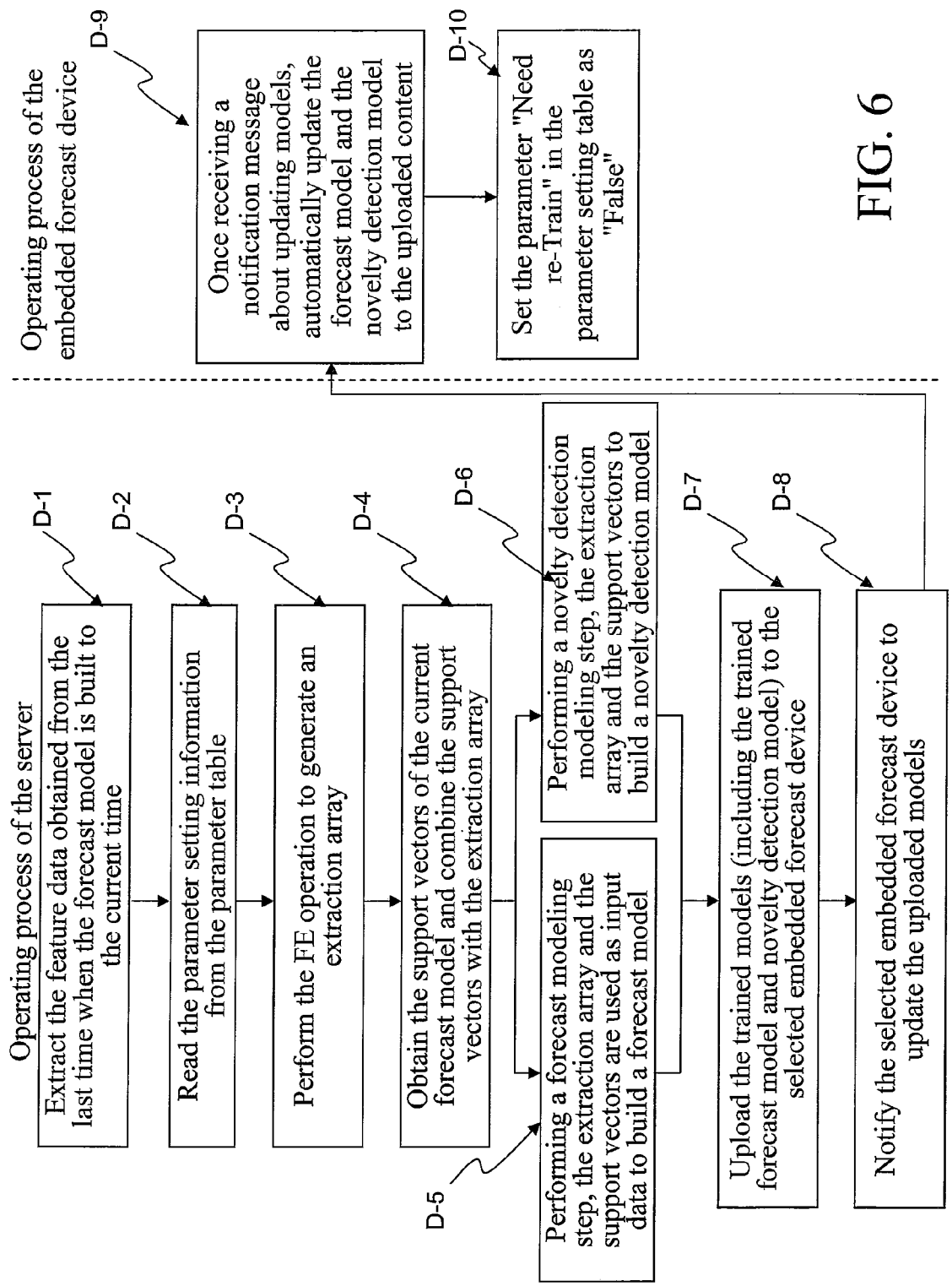
FIG. 6 is a partial detailed flow chart of the system for maintaining and analyzing a manufacturing equipment according to the present invention.

As described above, in Step D, once receiving the model retraining notification message, the server retrains the forecast model and the novelty detection model according to the new feature data and support vectors of the old model, and then uploads the retrained forecast model and novelty detection model to the embedded forecast device of the manufacturing equipment, thereby updating the forecast model and the novelty detection model. The detailed process of Step D is described as follows with reference to FIG. 6.

Step D-1. Once receiving the model retraining notification message, the server first extracts the feature data obtained from the last time when the forecast model is built to the current time.

Step D-2. The parameter setting information is read from the parameter table.

Step D-3. The FE operation is performed to generate an extraction array.

Step D-4. The support vectors of the current forecast model are obtained and combined with the extraction array.

Step D-5. Performing a forecast modeling step, the extraction array and the support vectors are used as input data to build a forecast model.

Step D-6. Performing a novelty detection modeling step, the extraction array and the support vectors are both employed to build a novelty detection model.

Step D-7. The trained models (including the trained forecast model and novelty detection model) are uploaded to the selected embedded forecast device.

Step D-8. The selected embedded forecast device is notified to update the uploaded models.

Step D-9. Once receiving a notification message about updating models, the embedded forecast device automatically updates the forecast model and the novelty detection model to the uploaded content.

Step D-10. The parameter "Need re-Train" in the parameter setting table is set as "False", and the process ends.

What is claimed is:

1. A system for maintaining and analyzing a manufacturing equipment, adapted to manage and maintain a forecast model of the manufacturing equipment, the system comprising:
an embedded forecast device, directly configured in the manufacturing equipment, the embedded forecast device comprising the forecast model and a feature extraction (FE) algorithm corresponding to the forecast model therein for obtaining a real time data of the manufacturing equipment and generating a forecast result, and embedded forecast device further comprising a novelty detection model corresponding to the forecast model for generating a model retraining notification message when the manufacturing equipment fails; and
a server, comprising:
a communication interface, for communicating with the embedded forecast device;
a plurality of different FE algorithms and a plurality of different modeling algorithms;
an operating interface, for selecting one of the FE algorithms and one of the modeling algorithms and for combining the selected FE algorithm and the selected modeling algorithm, so as to train and build the forecast model and the novelty detection model executed by the embedded forecast device according to the selected FE algorithm and the selected modeling algorithm; and
a parameter setting table, for recording setting parameters related to the training and building of the forecast model and the novelty detection model,
wherein the server retrains the forecast model and the novelty detection model according to the model retraining notification message, and updates the forecast model and the novelty detection model of the embedded forecast device according to the retrained forecast model and novelty detection model.

2. The system for maintaining and analyzing a manufacturing equipment according to claim 1, wherein the embedded forecast device comprises an embedded microprocessor, a communication module, a data storage unit, and an embedded operating system.

3. The system for maintaining and analyzing a manufacturing equipment according to claim 1, wherein the FE algorithm is one selected from a group consisting of kernel principal component analysis (KPCA), principal component analysis (PCA), and wavelet analysis algorithm, or any combination thereof.

4. The system for maintaining and analyzing a manufacturing equipment according to claim 1, wherein the modeling algorithm is one selected from a group consisting of support vector machine (SVM), support vector regression model (SVR Model), support vector data description (SVDD), radial basis function (RBF), and back-propagation neural network (BPN) algorithm, or any combination thereof.

5. The system for maintaining and analyzing a manufacturing equipment according to claim 4, wherein the novelty detection model is built according to the SVDD algorithm.

6. The system for maintaining and analyzing a manufacturing equipment according to claim 1, wherein a content of the parameter setting table comprises:
an identifier (ID) of the embedded forecast device, a communication address of the embedded forecast device, a data source of the manufacturing equipment, the adopted FE algorithm, parameter settings of the FE algorithm, an adopted training modeling algorithm, parameter settings of the training modeling algorithm, a parameter "whether an automatic retraining mechanism is performed or not" (Auto re-Train), a parameter "whether a retraining is needed or not" (Need re-Train), the forecast model, the novelty detection model, support vectors of the novelty detection model, and time for building the forecast model.

7. The system for maintaining and analyzing a manufacturing equipment according to claim 6, wherein the communication address of the embedded forecast device is an Internet protocol (IP) address.

8. A method for maintaining and analyzing a manufacturing equipment, adapted to manage and maintain models of the manufacturing equipments and automatically update the models, the method comprising:
providing an embedded forecast device, wherein the embedded forecast device is pre-loaded with a feature extraction (FE) algorithm, a novelty detection model, and a forecast model, and wherein the embedded forecast device is mounted in the manufacturing equipment for obtaining real time data of the manufacturing equipment, and then the FE algorithm is used to extract a feature data from the obtained real time data, so as to generate a forecast result through the forecast model;
providing a server, wherein the server is pre-loaded with various FE algorithms and various modeling algorithms, and an operating interface of the server is provided for a user to select one of the FE algorithms and one of the modeling algorithms, and to combine the selected FE algorithm and the selected modeling algorithm for training and building the forecast model and novelty detection model according to the selected FE algorithm and the selected modeling algorithm and for setting related parameters to be stored in a parameter table;
performing a novelty detection on the real time data of the manufacturing equipment, and sending a model retraining notification message when a new feature data is found;
retraining the models, wherein after receiving the model retraining notification message, the server retrains the forecast model and the novelty detection model according to the new feature data and support vectors of an old model; and updating the forecast model and the novelty detection model, wherein the server uploads the retrained forecast model and novelty detection model to the embedded forecast device of the manufacturing equipment for updating.

9. The method for maintaining and analyzing a manufacturing equipment according to claim 8, wherein the FE algorithm is one selected from a group consisting of kernel principal component analysis (KPCA), principal component analysis (PCA), and wavelet analysis algorithm, or any combination thereof.

10. The method for maintaining and analyzing a manufacturing equipment according to claim 8, wherein the modeling algorithm is one selected from a group consisting of support vector machine (SVM), support vector regression model (SVR Model), support vector data description (SVDD), radial basis function (RBF), and back-propagation neural network (BPN) algorithm, or any combination thereof.

11. The method for maintaining and analyzing a manufacturing equipment according to claim 10, wherein the novelty detection model is built according to the SVDD algorithm.

12. The method for maintaining and analyzing a manufacturing equipment according to claim 8, further comprising setting a parameter "whether an automatic retraining mechanism is performed or not" (Auto re-Train) in the parameter table, wherein once receiving the model retraining notification message, the server first checks the Auto re-Train parameter, and retrains the forecast model and the novelty detection model when the Auto re-Train parameter is set as "True".

13. The method for maintaining and analyzing a manufacturing equipment according to claim 8, further comprising setting a parameter "whether a retraining is need or not" (Need re-Train) in the parameter table, wherein when a new feature data is found, the novelty detection model sets the Need re-Train parameter as "True", and sends the model retraining notification message.

14. The method for maintaining and analyzing a manufacturing equipment according to claim 13, further comprising setting the Need re-Train parameter as "False" after the server uploads the retrained forecast model and novelty detection model to the embedded forecast device for updating.

* * * * *